United States Patent
Wagoner et al.

(10) Patent No.: US 7,928,592 B2
(45) Date of Patent: *Apr. 19, 2011

(54) WIND TURBINE WITH PARALLEL CONVERTERS UTILIZING A PLURALITY OF ISOLATED GENERATOR WINDINGS

(75) Inventors: Robert G. Wagoner, Roanoke, VA (US); Allen M. Ritter, Roanoke, VA (US); Anthony M. Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/164,158

(22) Filed: Jun. 30, 2008

(65) Prior Publication Data

US 2009/0322081 A1    Dec. 31, 2009

(51) Int. Cl.
  *F03D 9/00*    (2006.01)
(52) U.S. Cl. .................. 290/44; 322/44; 322/59
(58) Field of Classification Search .............. 290/44, 290/55; 322/24, 28, 44, 59; 363/37, 39, 363/45, 34, 98
See application file for complete search history.

(56) References Cited

U.S. PATENT DOCUMENTS

| | | | |
|---|---|---|---|
| 6,101,113 A | 8/2000 | Paice | |
| 6,140,915 A * | 10/2000 | Iwatani | 340/438 |
| 6,236,583 B1 * | 5/2001 | Kikuchi et al. | 363/132 |
| 6,680,856 B2 | 1/2004 | Schreiber | |
| 6,751,106 B2 | 6/2004 | Zhang et al. | |
| 6,859,374 B2 * | 2/2005 | Pollanen et al. | 363/69 |
| 6,917,271 B2 | 7/2005 | Zhang et al. | |
| 6,919,711 B2 * | 7/2005 | Haydock et al. | 322/24 |
| 7,109,687 B2 | 9/2006 | Kashihara | 322/24 |
| 7,235,891 B2 * | 6/2007 | Tokiwa et al. | 290/10 |
| 2002/0057030 A1 * | 5/2002 | Fogarty | 310/196 |
| 2004/0100102 A1 * | 5/2004 | Wobben | 290/55 |
| 2004/0160201 A1 | 8/2004 | Rahman et al. | |
| 2007/0040386 A1 * | 2/2007 | Shiota | 290/44 |
| 2007/0073445 A1 * | 3/2007 | Gonzalez et al. | 700/286 |
| 2007/0121353 A1 | 5/2007 | Zhang et al. | |
| 2008/0106100 A1 * | 5/2008 | Hyvarinen | 290/44 |
| 2009/0212568 A1 * | 8/2009 | Maibach et al. | 290/44 |
| 2009/0322082 A1 * | 12/2009 | Wagoner et al. | 290/44 |

FOREIGN PATENT DOCUMENTS

| | | |
|---|---|---|
| DE | 10301275 A1 | 8/2004 |
| EP | 1768223 A2 | 3/2007 |
| GB | 2394129 A | 4/2004 |

* cited by examiner

*Primary Examiner* — Julio Cesar Gonzalez
(74) *Attorney, Agent, or Firm* — Edward J. Smith; Ernest G. Cusick; Frank A. Landgraff

(57) ABSTRACT

A system and method are provided to isolate outputs of parallel converter threads of a power system converter on a generator side of a wind turbine generator by utilizing isolated power windings on the wind turbine generator. Such isolation eliminates the circulating common mode current between the parallel converters of the wind turbine system and eliminates the need for a common mode inductor. System reliability is enhanced and total system cost is reduced.

19 Claims, 8 Drawing Sheets

WIND TURBINE WITH PARALLEL CONVERTERS UTILIZING A PLURALITY OF ISOLATED GENERATOR WINDINGS

BACKGROUND OF THE INVENTION

The invention relates generally to wind turbine generators and more specifically to a method of interconnecting parallel power converters for the wind turbine generators to eliminate a common mode current, which circulates between the parallel power converters.

Generally, wind turbines use the wind to generate electricity. The wind turns multiple blades connected to a rotor. The spin of the blades caused by the wind spins a shaft of the rotor, which connects to a generator that generates electricity. Specifically, the rotor is mounted within a housing or nacelle, which is positioned on top of a truss or tubular tower, which may be as high as about 100 meters. Utility grade wind turbines (e.g., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is provided to a utility grid. Some turbines utilize generators that are directly coupled to the rotor without using a gearbox. Various types of generators may be used in these wind turbines.

Many devices, such as wind turbines, include power converter systems. A power converter system is typically used to convert an input voltage, which may be fixed frequency alternating current, variable frequency alternating current, or direct current, to a desired output frequency and voltage level. A converter system usually includes several power semiconductor switches such as insulated gate bipolar transistors (IGBTs), integrated gate commutated thyristors (IGCTs or GCTs), or metal oxide semiconductor field effect transistors (MOSFETs) that are switched at certain frequencies to generate the desired converter output voltage and frequency. The converter output voltage is then provided to various loads. Loads, as used herein, are intended to broadly include motors, power grids, and resistive loads, for example.

FIG. 1 is a block diagram of a typical power system coupled to a wind turbine with synchronous wound-field or permanent magnet generator and implemented according to one aspect of the invention. The power system 10 is adapted to provide output power to grid 21. A wind turbine 12 is configured for converting wind energy to mechanical energy. The wind turbine is coupled through a gear box 19 to generator 14 or alternatively coupled directly to generator 14. Wind energy is captured by the rotation of the wind turbine's blades, and generator 14 is configured by a power converter system 20 controlled by converter control system 24 for generating a variable frequency input power. The power is transformed to appropriate voltage by one or more transformers 22 and supplied to the power grid 21.

To accommodate the need for greater power from windfarms, individual wind turbine generators are increasingly being provided with higher power output capability. To accommodate the higher power output from the wind turbine generators, some wind turbine systems are provided with multiple parallel converters (also known as converter threads). Multiple parallel converters may also provide an advantage in wind converters due to the desire for high availability and low distortion Typically, power converter systems use multiple power converter bridges in parallel with gating control to expand power-handling capability. In wind turbine applications, a power converter bridge usually refers to a three-phase converter circuit with six power switches. In order to meet both grid side and machine side power quality requirements, such systems generally use very large and costly filters to smooth out pulse width modulated waveforms. Such systems sometimes cause overheating of the generator and/or transformers and other distortion-sensitive equipment due to high harmonic components, when the large and costly filters are minimized.

FIG. 2 is a block diagram of a typical power system employing multiple parallel converters. Power system 10 is configured for supplying power to a load 21. A generator source 14 is configured to generate an AC input power. The AC input power is provided to power converter system 20. The power converter system 20 comprises converters 20-1 through 20-N. The converters are coupled in parallel and configured to receive the AC input power from the generator source 14. The power converter system 20 is configured to convert the AC input power to an AC output power. The AC output power is provided to load 21. Loads may include motors, power grids, and resistive loads, for example. Although grids are traditionally suppliers of power, in most wind turbine system embodiments, wind turbine power is supplied to a utility grid, which acts as a load.

The plurality of multiple parallel converters 20-1 to 20-N, each one of which (also called threads) has a fraction of the net system rating. These converter threads are tied together on both the input and output ends to form a net current/power rating on both the input and output that is directly related to the number of converter threads in parallel. Typically, one side of the converter is connected to a common power source (for example the grid) and the other to a plant (for example a generator). The circuit connecting the converter to the power grid will usually be referenced to ground. For cost and size reasons, each thread is connected to a common point on the grid and the plant with conductors that are sized in accordance with the rating of each thread and not the system rating.

Converter control system 24 is configured to provide control signals for the operation of the power converter system 20. The converter control system is coupled to the converter system and is configured to drive the converter system according to predesignated switching patterns. The predesignated switching patterns provided by the converter control system may provide for synchronous gating of the multiple parallel converters or may provide an interleaved manner of control for each converter thread with phase displaced gating signals to reduce overall switching harmonic components due to cancellation of phase shifted switching waveforms.

FIG. 3 is a block diagram of a typical thread one thread of a power converter system. Wind turbine embodiments, for example, typically comprise three-phase power converter systems. Converter 20-1 represents one thread of power converter system 20. Converter 20-1 includes generator converter bridge 30 for AC-DC conversion, DC link 35, and load converter bridge 40 for DC-AC conversion at a suitable voltage and frequency. Generator converter bridge 30 may be implemented using six semiconductor power switches 45. Similarly, load side bridge 40 may be implemented using six semiconductor power switches 45. Generator side chokes 50 and load side chokes 55 may be sized to enable either non-interleaved or interleaved gating Switching of power semiconductors in the converter threads causes a difference in voltage between the parallel converters, which creates a common mode current that flows between the converter threads, even without having a ground fault on the system. The common mode current will flow in a circular loop between the power converter threads, but not have any impact on the net current in either the grid or the plant. Common mode chokes 60 suppresses the high frequency (switching frequency range) common mode cross current that links both generator side converters and the load side converters.

FIG. 4 illustrates common mode current flow in a power system converter with n-paralleled converter threads (20-1 to 20-n) connected to a grid 21 and to a wind turbine generator 14. For example, it is possible that a current can flow into thread T1_L_Ia 110 and out T1_G_Ia 115 and return through thread T2_G_Ia 120 and T2_L_Ia 125. There are many combinations of loops for such current that will not affect the net current. However, these common mode currents, as well as normal mode circulating currents, force converter switching devices and other components to operate closer to thermal limits. Further, these common mode currents may cause a direct error in the measurement of ground fault currents of that loop, thereby making fault detection more difficult. Large common mode inductors are required to limit the amount of circulating common mode current between the converters, as well as, large normal mode reactors to limit circulating normal mode current where phase shifting is utilized to reduce net distortion.

Accordingly, there is a need to provide a structure and method for interconnecting the wind turbine generator windings with the power converter in a manner so as to reduce or eliminate the common mode current that flows between the parallel power converters, without the need for common mode inductors coupled to a capability to phase shift multiple thread converters to reduce the need for bulky filters.

BRIEF DESCRIPTION OF THE INVENTION

Recently, wind turbines have received increased attention as an environmentally safe and relatively inexpensive alternative energy source. With this growing interest, considerable efforts have been made to develop wind turbines that are reliable and efficient. This invention relates to a specific method of interconnecting power converters in wind turbines, which allows optimization of system cost and reliability by eliminating the common mode current that circulates between parallel power converters.

According to a first aspect of the present invention, a power system for providing an output power to a load is provided. The power system includes a generator configured to generate an alternating current input power to a power converter system. The power converter system is coupled to the generator and interconnected to generate an output power and provide the output power to the load, wherein the converter system includes a plurality of parallel converter threads. A converter control system is coupled to the power converter system and configured to drive the converter system to reduce harmonic components in the output power or the alternating current input power. Isolation means for the input power to the converter from the generator are adapted to prevent common mode current circulation between the parallel converter threads.

According to a second aspect of the present invention, a method is provided for eliminating common mode currents in a power system that supplies a power output to a load from a power converter system, including a plurality of parallel converter threads. The method includes operating the generator according to a controller to supply ac power to power system converter; supplying the ac power to the power system converter through a plurality of sets of isolated power generating windings of the generator, wherein one set of the isolated power generator windings of the generator feeds a corresponding converter thread of the plurality of converter threads. The method further includes operating the plurality of converter threads according to a controller for the power converter system; adapted to drive the power converter system to reduce harmonic components in the power output or the alternating current input power.

According to a third aspect of the present invention, a wind turbine power system is adapted to prevent common mode current circulation among power system converter threads when providing output power to an electrical power grid. The wind turbine power system includes a wind turbine generator controlled by a wind turbine controller configured to generate an alternating current input power to a power converter system. The power converter system is coupled to the wind turbine generator and interconnected to generate an output power and provide the output power to the load. The power converter system includes a plurality of the parallel converter threads. A converter control system is coupled to the power converter system and configured to drive the parallel converter threads to reduce harmonic components in the output power or the alternating current input power. The isolation means for the input power to the converter from the wind turbine generator is adapted to prevent common mode current circulation between the parallel converter threads. A plurality of sets of isolated power windings on the wind turbine generator is provided. Each set of the plurality of sets of isolated power windings on the generator interconnects with only one of a corresponding parallel converter thread of the plurality of parallel converter threads.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including eliminating the circulating common mode current between parallel converters threads. In order to eliminate the circulating common mode current between parallel converters of the wind turbine system, the new structure and method described are to isolate outputs of the parallel converter threads on the load side by utilizing isolated power windings on a system power generator. Such an arrangement eliminates the need for a common mode inductor, promoting system reliability and reducing the total system cost.

Figure 1:
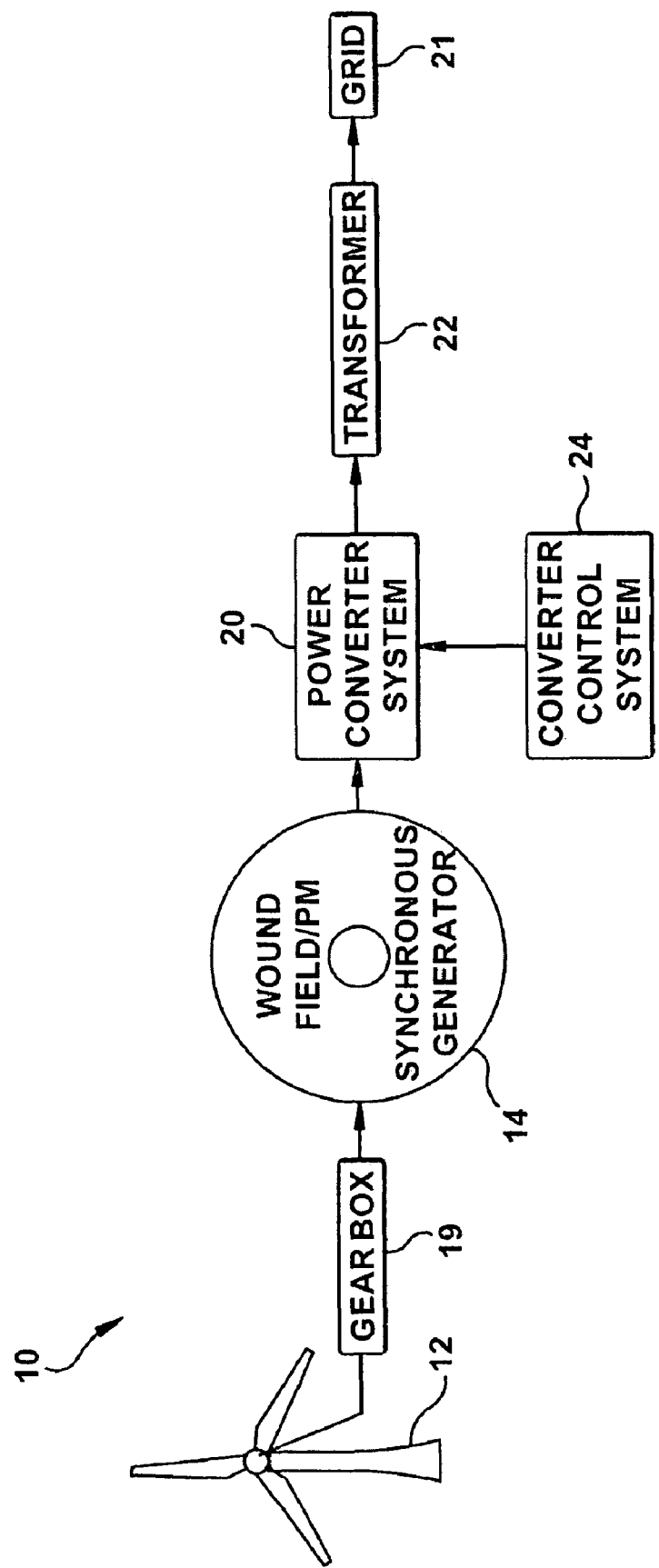
FIG. 1 illustrates a typical wind turbine generator power system for delivering an electric power output through a power system converter to a load from the wind turbine generator.
Figure 2:
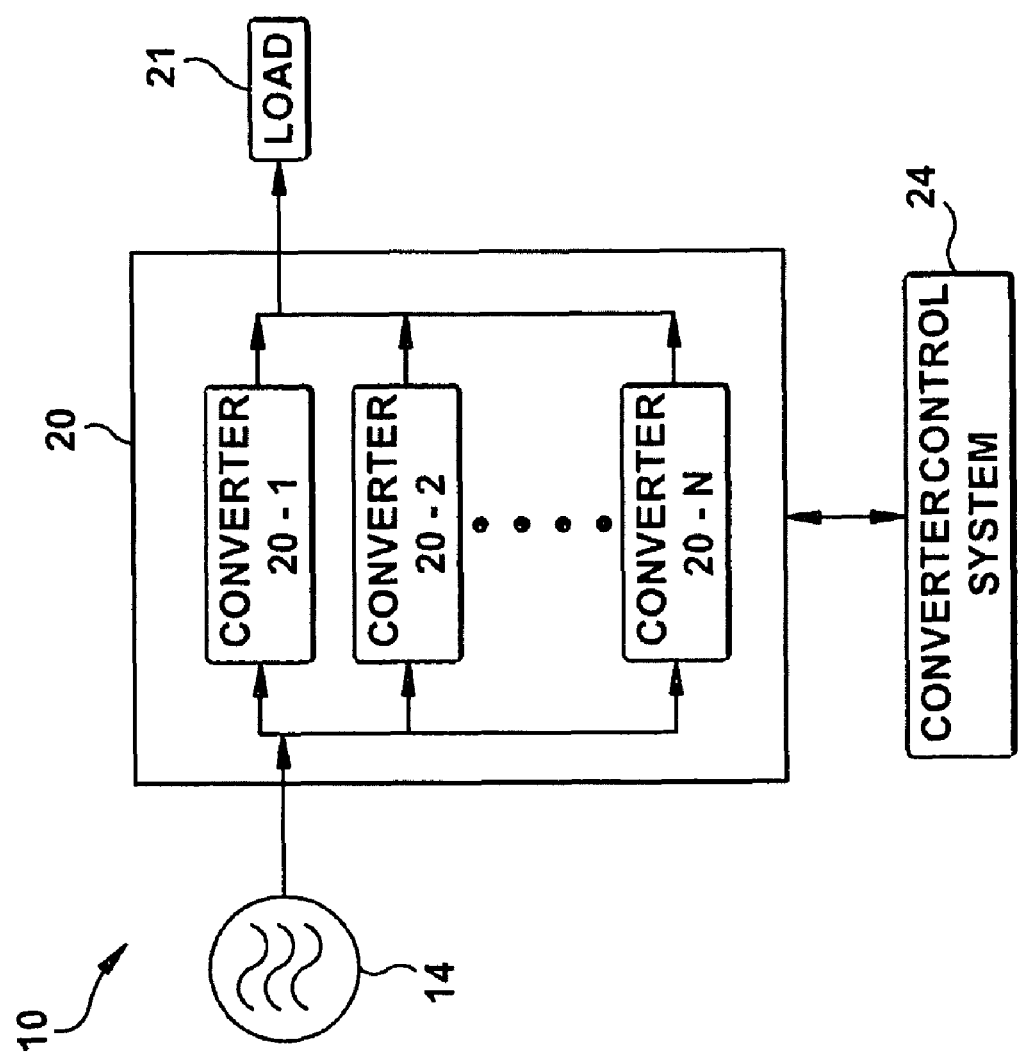
FIG. 2 illustrates a block diagram of a typical power system employing multiple parallel frequency and voltage converters.
Figure 3:
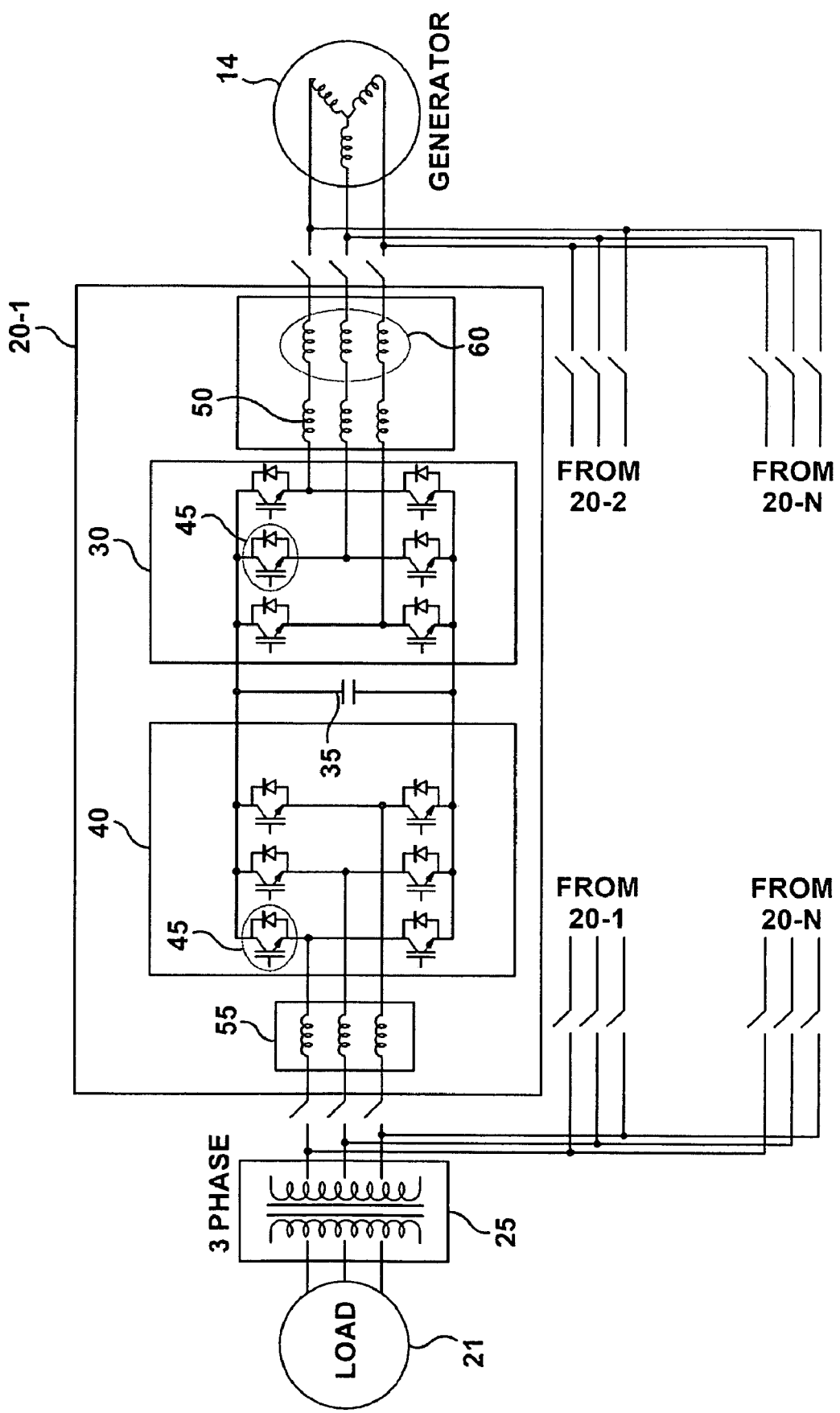
FIG. 3 illustrates a block diagram of a typical thread one thread of a power converter system.
Figure 4:
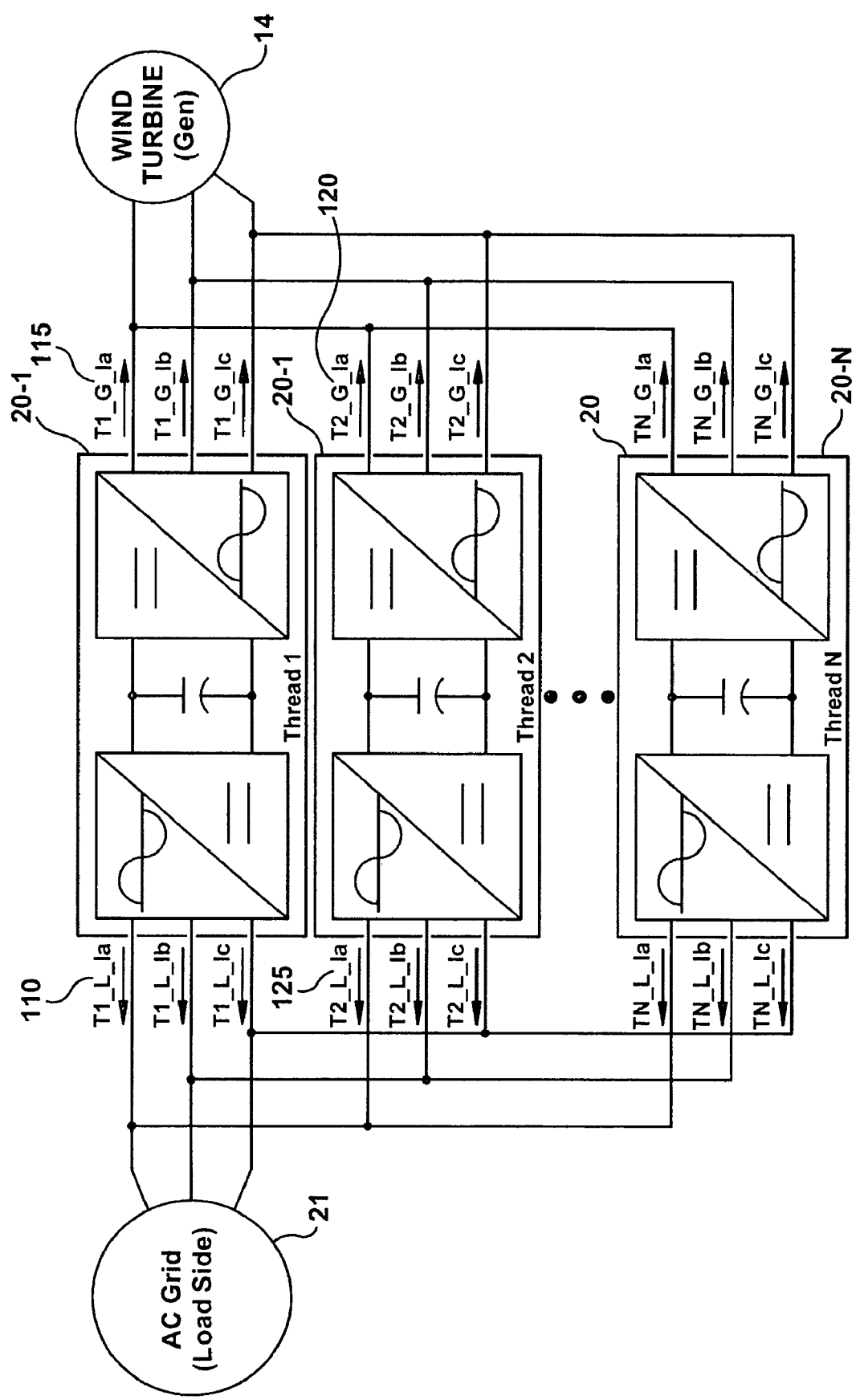
FIG. 4 illustrates common mode current flow in a power system converter with paralleled converter threads.
Figure 5:
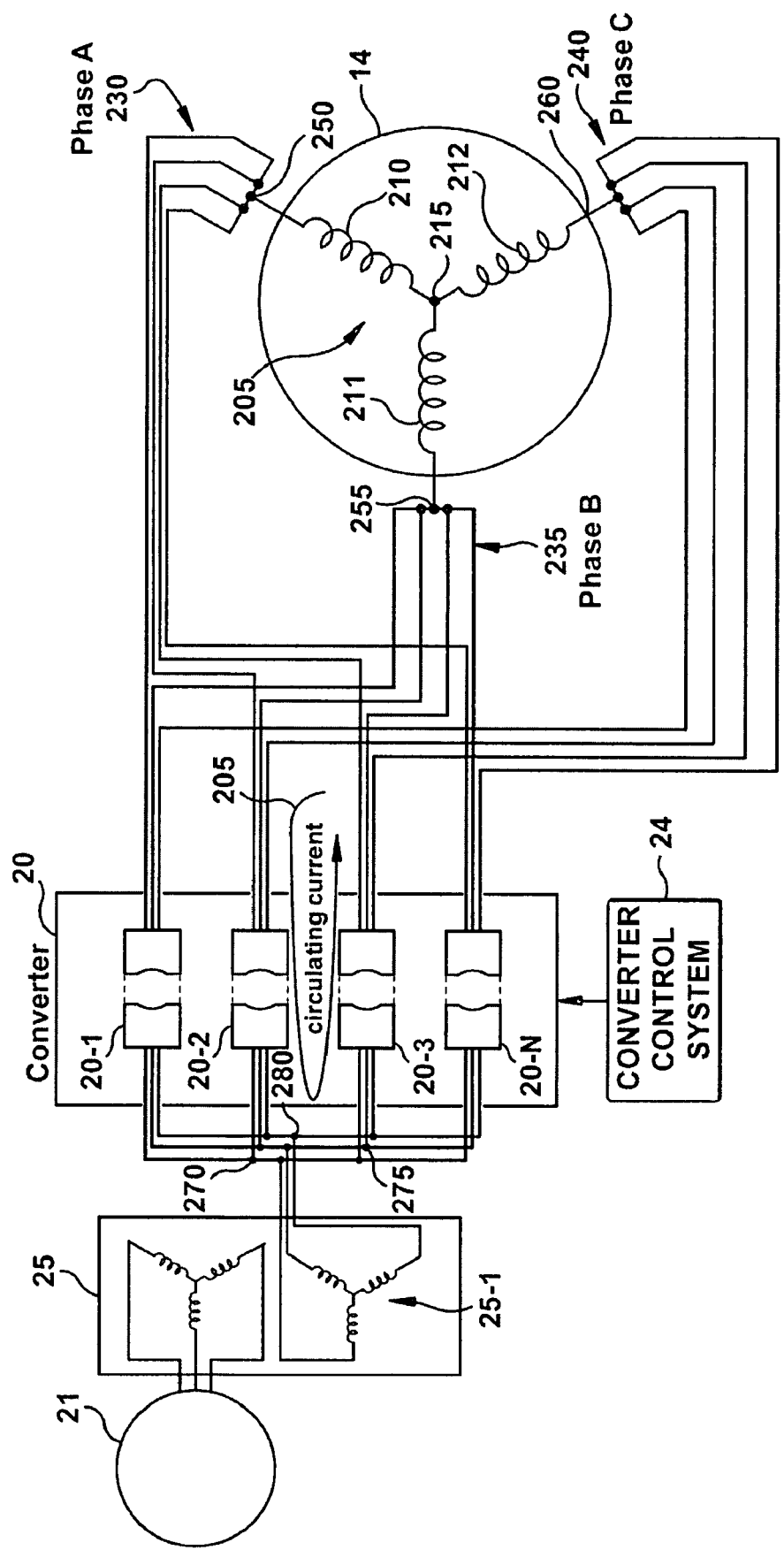
FIG. 5 illustrates the power input and output connections for converter threads of a power converter system being supplied by generator.

FIG. 5 illustrates the power output connections for prior art, non-isolated windings of a wind turbine generator power with generator-side parallel converter threads for a power converter system. The power system converter 20 includes parallel converter threads 20-1, 20-2, 20-3, 20-n. The generator power windings 205 for wind turbine generator 14 may be configured in a wye arrangement, with power windings 210, 211, 212 tied at the wye neutral point 215. The opposite end of each phase of the power windings 210, 211, 212 (opposite from the wye neutral) may be tied to each input 250, 255, 260 of one corresponding phase (Phase A 230, Phase B 235, Phase C 240) for each of the parallel converter threads 20-1 to 20-n. Inputs of corresponding phase connections from each of the converter threads are tied together Inputs from the converter threads 20-1 to 20-n are similarly tied at points 270, 275 and 280 to converter side windings 25-1 for main transformer 25, permitting common mode circulating current 205 to flow in closed loop between converter threads.

Figure 6:
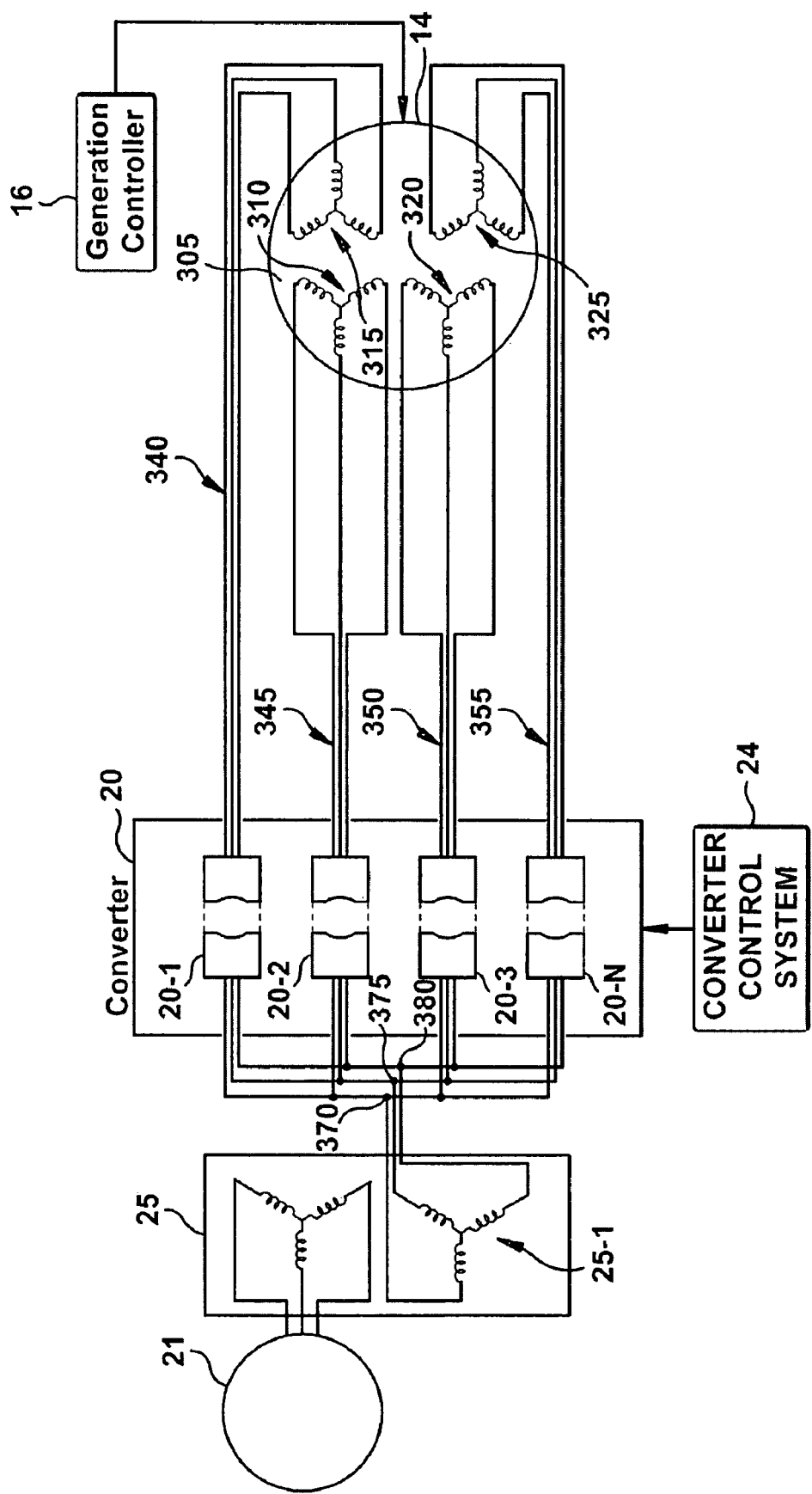
FIG. 6 illustrates an embodiment of a power system including a power converter system incorporating a plurality of parallel converter threads supplied by isolated, wye-connected, power windings of a generator.
Figure 7:
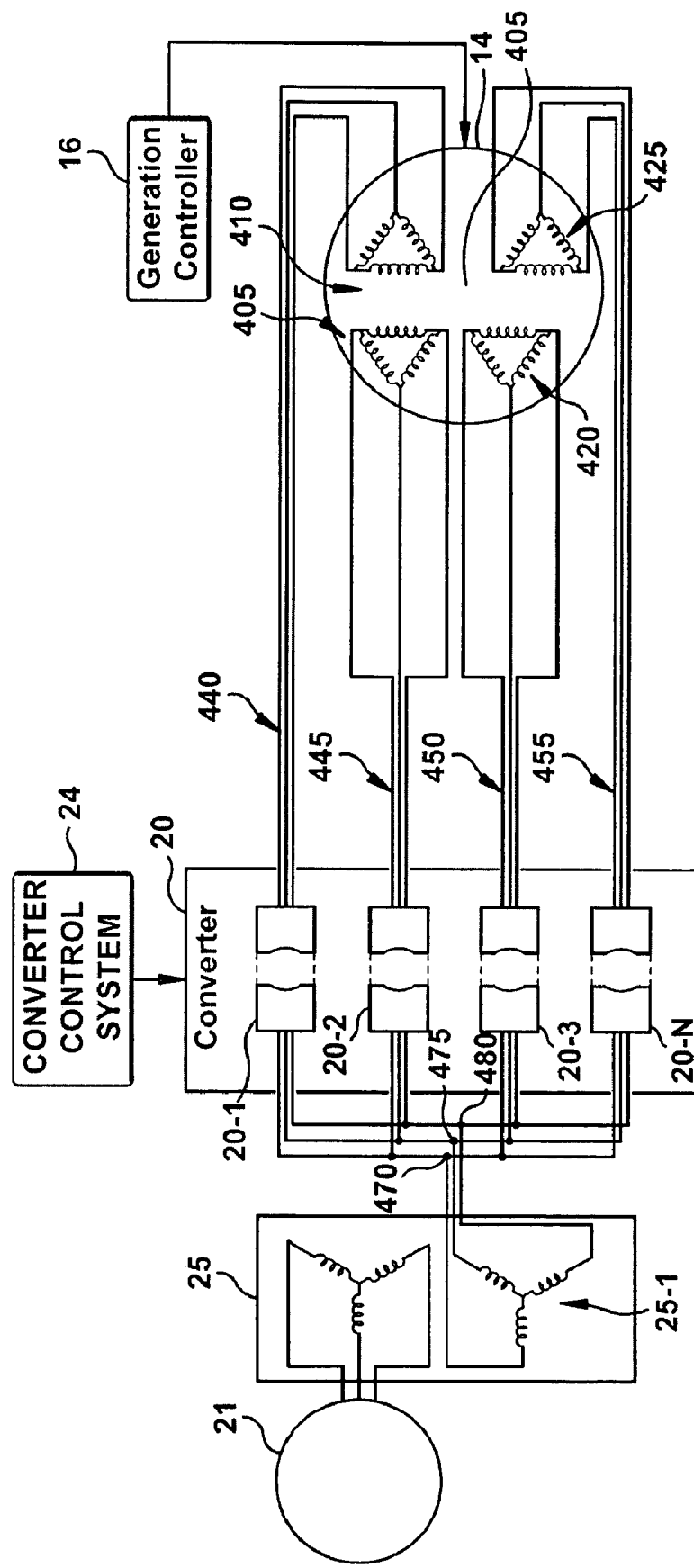
FIG. 7 illustrates another embodiment of a power system including a power converter system incorporating a plurality of parallel converter threads supplied by isolated, delta-configured, power windings, of a generator.

FIG. 6 illustrates an embodiment of a power system including a power converter system incorporating a plurality of parallel converter threads being powered by isolated power windings of the generator in a wye configuration. A wind turbine generator 14 operating under generator controller 16 may supply inputs 340, 345, 350, 355 to an exemplary four parallel converter threads 20-1 to 20-n of power system converter 20 from four sets of isolated three-phase windings 310, 315, 320, 325 (one isolated three-phase winding for each individual converter thread) of generator power windings 305. In the instant example, isolated windings in a wye configuration are illustrated. However, the isolated wind turbine generator windings 405 may be configured in delta-configured three-phase windings 410, 415, 420 425 to supply input to the four exemplary parallel converter threads 20-1 to 20-n of power system converter 20, as illustrated in FIG. 7. Although not illustrated, the isolated transformer windings for input from the generator to the power system converter may include a star configuration or any other transformer arrangement suitable for power application. While this embodiment has described a power system and a power converter for a wind turbine generator, it is understood that the present invention may be generally applicable to other types of power systems, electric power generators and power system converters.

Inputs for corresponding phases of converter threads 20-1 to 20-n to the converter side windings 25-1 of main transformer 25 may remain tied together at points 370 (470), 375 (475), 380, (480) as shown in FIG. 6 (FIG. 7) respectively. Because the generator windings 305 (405) are isolated for the individual converter threads, the converter threads are no longer galvanically connected on the generator side, thereby preventing the flow of common mode currents on the generator side between the converter threads. With the elimination of the common mode currents flowing between the converter threads, the common mode reactor may be eliminated, reducing cost, complexity, and size of the converter thread.

Isolation of the generator windings for providing electric power input to the converter may further be combined with isolation of the windings for the electric output of the parallel converter threads of the converter on an output transformer.

In a further embodiment of the present invention, a method is provided for eliminating common mode currents in a power system supplying a power output to a load from a power converter system including a plurality of parallel converter threads. The method may include operating a wind turbine generator according to a wind turbine controller for providing an electrical output to a grid through a converter, including a plurality of parallel converter threads. The method also includes supplying electrical power to each of the parallel converter threads through an isolated winding of the wind turbine generator that is electrically isolated from the isolated winding supplying other threads of the parallel converter. The method further includes operating the parallel converter threads to supply electrical power to the grid using the electrical power supplied by the isolated winding of the wind turbine generator.

Figure 8:
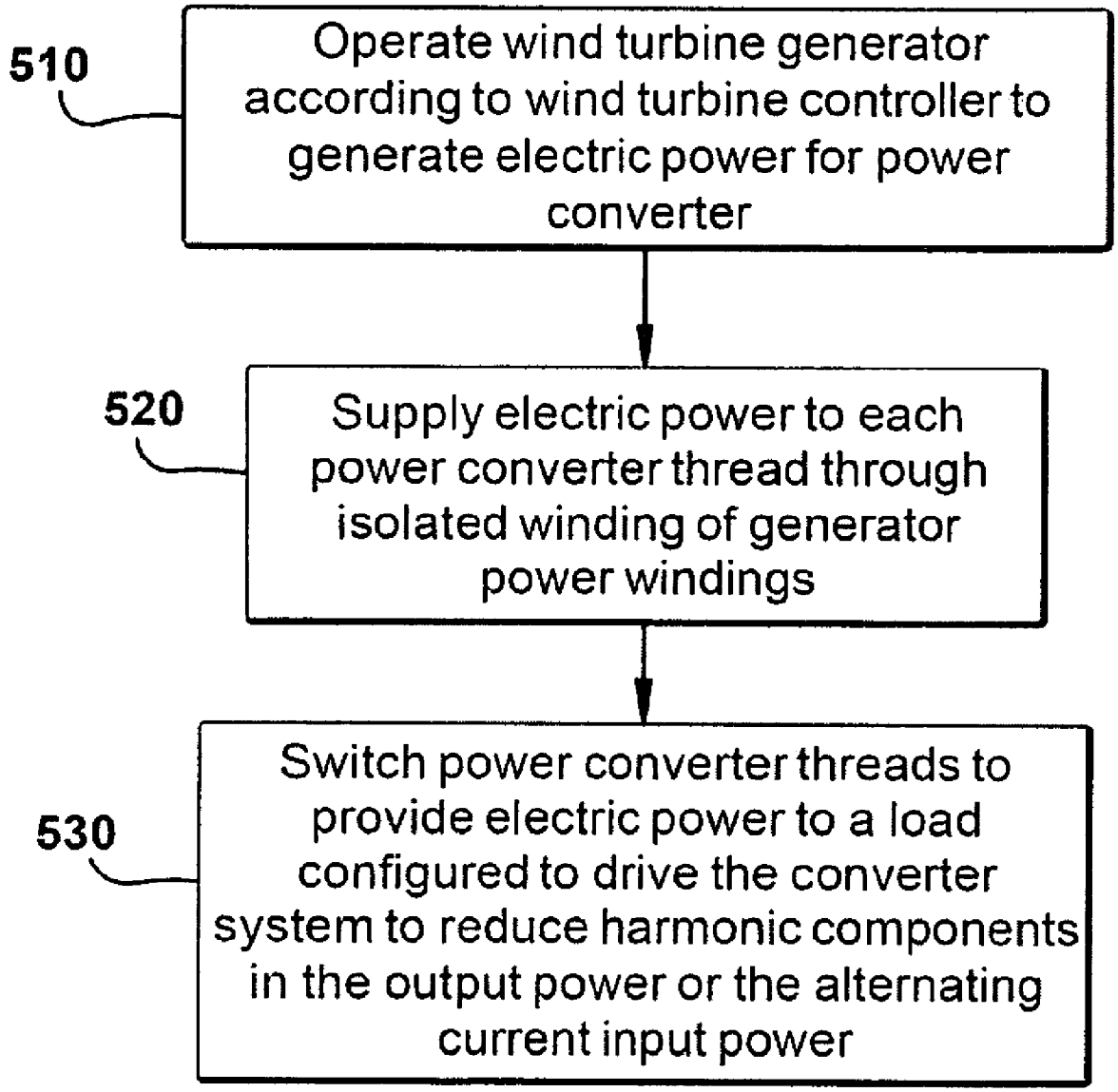
FIG. 8 illustrates a flowchart for a method of eliminating common mode currents in a power system supplying power output to a load from a power converter system including a plurality of parallel converter threads.

FIG. 8 illustrates a flowchart of a method for eliminating common mode currents in a power system supplying a power output to a load from a power converter system including a plurality of parallel converter threads. Initial step 510, operates a wind turbine generator according to a wind turbine generator controller for supplying an electrical output to a grid through a converter including a plurality of parallel converter threads. Step 520 supplies electrical power to each of the parallel converter threads through an isolated winding of the wind turbine generator. In step 530, the converter operates the parallel converter threads to supply electrical power to the grid using the electrical power supplied by the isolated winding of the wind turbine generator. In operating the parallel converter threads, the controller for the converter provides gating signals to the semiconductor switches of the parallel converter threads. Gating by the parallel converter threads may be performed in an interleaved or a non-interleaved pattern.

While various embodiments are described herein, it will be appreciated from the specification that various combinations of elements, variations or improvements therein may be made, and are within the scope of the invention.

The invention claimed is:

1. A power system for providing an output power to a load, the system comprising;
a generator configured to generate an alternating current input power to a power converter system;
a power converter system coupled to the generator and interconnected to generate an output power and provide the output power to the load, wherein the converter system includes a plurality of parallel converter threads; each parallel converter thread including, in series, a semiconductor bridge ac-to-dc converter and a semiconductor bridge dc-to-ac converter;
a converter control system coupled to the power converter system and configured to drive the converter system to reduce harmonic components in the output power or the alternating current input power; and
isolation means for the input power to the converter from the generator, preventing common mode current circulating between the parallel converter threads as powered by voltage differences between the parallel converter threads generated by switching of power semiconductors of the semiconductor bridges of the parallel converter threads, the isolation means including a plurality of sets of electrically isolated power windings on the generator wherein each set of the plurality of sets of electrically isolated power windings on the generator electrically interconnects only with a corresponding parallel converter thread of the plurality of parallel converter threads, and wherein the set of isolated power windings on the generator comprises a three-phase power winding and each of the plurality of parallel converter threads comprises a three-phase power input.

2. The power system of claim 1, wherein electrical separation of the isolated power windings on the generator are maintained by physically interconnecting the isolated power windings of the generator with only one corresponding parallel converter thread of the plurality of parallel converter threads.

3. The power system of claim 1, wherein the three-phase power winding comprises:
wye-connected generator power output windings.

4. The power system of claim 1, wherein the three-phase power winding comprises:
delta-connected generator power output windings.

5. The power system of claim 1, wherein the three-phase power winding comprises:
star-connected generator power output windings.

6. The power system of claim 1, wherein the generator comprises: a wind turbine generator.

7. The power system of claim 1, wherein the load comprises: an electric power grid.

8. The power system of claim 1, wherein the converter control system drives the parallel converter threads of the converter system according to an interleaved control scheme.

9. The power system of claim 1, wherein the converter control system drives the parallel converter threads of the converter system according to a non-interleaved control scheme.

10. A method for eliminating circulating common mode currents in a power system supplying a power output to a load from a power converter system including a plurality of parallel converter threads with each parallel converter thread including, in series, a semiconductor bridge ac-to-dc converter and a semiconductor bridge dc-to-ac converter, wherein the circulating common mode currents between the parallel converter threads are powered by voltage differences between the parallel converter threads generated by switching of power semiconductors of the semiconductor bridges of the parallel converter threads, the method comprising:
operating the generator according to a controller to supply ac power to a power system converter;
supplying the ac power to the power system converter through a plurality of sets of electrically isolated three-phase power generating windings of the generator, wherein each set of the electrically isolated three-phase power generator windings of the generator electrically feeds only one corresponding converter thread of the plurality of converter threads;
blocking circulating common mode currents from flowing between parallel converter threads; and
operating the plurality of converter threads according to a converter control system for the power converter system adapted to drive the power converter system to reduce harmonic components in at least one the power output and the alternating current input power.

11. The method of claim 10, wherein the step of supplying further comprises physically interconnecting the isolated power windings of the generator with only one corresponding parallel converter thread of the plurality of parallel converter threads.

12. The method for eliminating common mode currents according to claim 10, further comprising: supplying the ac power to the power system converter through sets of isolated, wye-configured, three-phase power windings on the generator.

13. The method for eliminating common mode currents according to claim 10, further comprising: supplying the ac power to the power system converter through sets of isolated, delta-configured, three-phase power windings on the generator.

14. The method for eliminating common mode currents according to claim 10, further comprising: supplying the ac power to the power system converter through sets of isolated, star-configured, three-phase power windings on the generator.

15. The method for eliminating common mode currents according to claim 10, wherein the generator comprises a wind turbine generator and the load comprises an electric power grid.

16. The method for eliminating common mode currents according to claim 10 further comprising: driving the parallel converter threads of the converter system by the converter control system according to an interleaved control scheme.

17. The method for eliminating common mode currents according to claim 10 further comprising: driving the parallel converter threads of the converter system by the converter control system according to a non-interleaved control scheme.

18. A wind turbine power system adapted to prevent common mode current circulation among power system converter threads powered by voltage differences between parallel converter threads generated by switching of power semiconductors of the semiconductor bridges of the parallel converter threads when providing output power to an electrical power grid, the system comprising:
a wind turbine generator controlled by a wind turbine controller configured to generate an alternating current input power to a power converter system;
a power converter system coupled to the wind turbine generator and interconnected to generate an output power and provide the output power to the load, wherein the power converter system includes a plurality of the parallel converter threads, each parallel converter thread including, in series, a semiconductor bridge ac-to-dc converter and a semiconductor bridge dc-to-ac converter;
a converter control system coupled to the power converter system and configured to drive the parallel converter threads to reduce harmonic components in the output power or the alternating current input power; and
a plurality of sets of electrically isolated three-phase power windings on the wind turbine generator, wherein each set of the plurality of sets of electrically isolated three-phase power windings of the generator electrically interconnects with only one corresponding parallel converter thread of the plurality of parallel converter threads, blocking common mode circulating currents from flowing between individual converter threads.

19. The wind turbine power system according to claim 18, wherein the sets of isolated power windings on the wind turbine generator comprise three-phase power winding configured in at least one of a wye configuration, a delta configuration and a star configuration.

* * * * *